US010531132B2

(12) United States Patent
Kumar et al.

(10) Patent No.: US 10,531,132 B2
(45) Date of Patent: Jan. 7, 2020

(54) METHODS AND TECHNIQUES FOR REDUCING LATENCY IN CHANGING CHANNELS IN A DIGITAL VIDEO ENVIRONMENT

(71) Applicants: STMicroelectronics International N.V., Schiphol (NL); STMicroelectronics, Inc., Coppell, TX (US)

(72) Inventors: Udit Kumar, Noida (IN); Bharat Jauhari, Noida (IN); Chandandeep Singh Pabla, Fremont, CA (US)

(73) Assignees: STMicroelectronics International N.V., Schiphol (NL); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 15/856,509

(22) Filed: Dec. 28, 2017

(65) Prior Publication Data

US 2019/0208240 A1 Jul. 4, 2019

(51) Int. Cl.
*H04N 21/438* (2011.01)
*H04N 21/234* (2011.01)
(Continued)

(52) U.S. Cl.
CPC ..... *H04N 21/23424* (2013.01); *H04N 5/4401* (2013.01); *H04N 21/434* (2013.01);
(Continued)

(58) Field of Classification Search
CPC ........... H04N 21/23424; H04N 5/4401; H04N 21/4331; H04N 21/434; H04N 21/44016; H04N 21/482; H04N 21/4384
See application file for complete search history.

(56) References Cited

U.S. PATENT DOCUMENTS 6,512,552 B1 * 1/2003 Subramanian ........... H04N 5/04
348/423.1
6,728,965 B1 * 4/2004 Mao ..................... H04N 5/4401
348/526
(Continued)

FOREIGN PATENT DOCUMENTS

EP 1523190 A1 4/2005
WO WO-2013139804 A1 9/2013

OTHER PUBLICATIONS

EPO Extended Search Report and Written Opinion for EP Appl. No. 18152602 dated Jul. 13, 2018 (9 pages).

*Primary Examiner* — Robert J Hance
(74) *Attorney, Agent, or Firm* — Crowe & Dunlevy

(57) ABSTRACT

A channel stream is received and demultiplexed into a video packetized elementary stream (PES), audio packetized elementary stream (PES), and program clock reference (PCR). Indexing circuitry stores the video PES and the audio PES in a buffer, locates a presentation time stamp (PTS) in the video PES and stores that PTS in the buffer, locates a start of each group of pictures (GOP) in the video PES and stores those locations in the buffer, and locates a PTS in the audio PES and stores that PTS in the buffer. Control circuitry empties the buffer of an oldest GOP in the video PES if the PCR is greater than the PTS of a second oldest GOP stored in the buffer, and empties the buffer of each PES packet of the audio PES that has a PTS that is less than the PTS of the oldest GOP stored.

19 Claims, 3 Drawing Sheets

(51) Int. Cl.
  *H04N 21/44* (2011.01)
  *H04N 5/44* (2011.01)
  *H04N 21/433* (2011.01)
  *H04N 21/434* (2011.01)
  *H04N 21/482* (2011.01)

(52) U.S. Cl.
  CPC ..... *H04N 21/4331* (2013.01); *H04N 21/4384* (2013.01); *H04N 21/44016* (2013.01); *H04N 21/482* (2013.01)

(56) References Cited

U.S. PATENT DOCUMENTS

| | | | |
|---|---|---|---|
| 7,562,375 B2 | 7/2009 | Barrett et al. | |
| 8,381,258 B2 | 2/2013 | Mukherjee et al. | |
| 8,842,740 B2 | 9/2014 | Wan | |
| 2001/0036355 A1* | 11/2001 | Kelly | G11B 27/034 386/290 |
| 2003/0043847 A1 | 3/2003 | Haddad | |
| 2004/0160974 A1 | 8/2004 | Read et al. | |
| 2005/0081244 A1* | 4/2005 | Barrett | H04L 12/185 725/97 |
| 2005/0094733 A1* | 5/2005 | Daniell | H04N 5/4401 375/240.25 |
| 2005/0229221 A1* | 10/2005 | Kerofsky | H04N 21/42607 725/100 |
| 2007/0160038 A1 | 7/2007 | Liu et al. | |
| 2008/0152312 A1 | 6/2008 | Levy et al. | |
| 2008/0192839 A1 | 8/2008 | Gahm et al. | |
| 2008/0307482 A1* | 12/2008 | Dandekar | H04N 21/235 725/131 |
| 2010/0218231 A1* | 8/2010 | Frink | H04N 7/17318 725/118 |
| 2011/0289544 A1 | 11/2011 | Goosen et al. | |
| 2012/0002731 A1* | 1/2012 | Pelts | H04N 7/52 375/240.25 |
| 2013/0089156 A1 | 4/2013 | Gautier et al. | |
| 2013/0259115 A1* | 10/2013 | Stieglitz | H04N 19/436 19/436 |
| 2014/0375894 A1* | 12/2014 | Kellerman | H04N 21/4347 348/731 |
| 2018/0139496 A1* | 5/2018 | Gustafsson | H04N 21/2662 |
| 2019/0082216 A1* | 3/2019 | Chen | H04N 21/4384 |

\* cited by examiner

METHODS AND TECHNIQUES FOR REDUCING LATENCY IN CHANGING CHANNELS IN A DIGITAL VIDEO ENVIRONMENT

TECHNICAL FIELD

This disclosure relates in general to changing channels in a digital video environment and, more particularly, to reducing the video presentation latency when changing from one video channel to another video channel.

BACKGROUND

Digital video transmission technology enables satellite and cable operators to increase the number and kinds of services that they offer to subscribers. Although digital technology brings advantages to operators and subscribers as compared to traditional analog networks, it also has a number of drawbacks. For example, changing channels in a digital television service typically takes longer than in an analog television service, with a noticeable delay being introduced between when a user initiates a channel change and when the channel change actually occurs. This channel changing latency may annoy and frustrate users of digital television services.

While certain techniques for reducing channel change latency are known, these techniques suffer from drawbacks such as the channel being changed to being initially displayed in a lower resolution, or the need for complex decoding and storage circuitry in a multi-media device that receives raw data from the provider and provides an output signal to the television.

Therefore, further development in the area of reducing the latency of channel change in digital video systems, which can be referred to as a "fast channel change," is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a multi-media device, such as a set top box, including demultiplexing circuitry configured to receive a channel stream and to demultiplex from the channel stream a video packetized elementary stream (PES), an audio packetized elementary stream (PES), and a program clock reference (PCR). The video PES and the audio PES are stored in buffering circuitry. Indexing circuitry is configured to locate a presentation time stamp (PTS) in the video PES, and store in the buffer circuitry a value and location of that PTS. The indexing circuitry is further configured to locate a start of each group of pictures (GOP) in the video PES to be stored in the buffering circuitry, and store in the buffer circuitry locations of the starts of those GOPs.

The indexing circuitry is also configured to locate a presentation time stamp (PTS) in the audio PES, and store in the buffer circuitry a value and location of that PTS. Buffer control circuitry is configured to empty the buffer circuitry of the oldest GOP in the video PES if the current PCR is greater than the PTS of the second oldest GOP in the video PES, and empty the buffer circuitry of each PES packet of the audio PES that has a PTS that is less than the PTS of the oldest GOP stored in the buffer circuitry.

The video PES as embedded in the channel stream may be at a first resolution, and the video PES received from the demultiplexing circuitry may be at a second resolution. In an embodiment, the first and second resolutions may be the same resolution (e.g., 1920×1080). In addition, playback circuitry may be configured to play the channel stream by synchronizing the first video PES and the first audio PES.

Also disclosed herein is a multi-media device including first demultiplexing circuitry configured to receive a first channel stream and to demultiplex from the first channel stream a first video packetized elementary stream (PES) and a first program clock reference (PCR), and second demultiplexing circuitry configured to receive a second channel stream and to demultiplex from the second channel stream a second video packetized elementary stream (PES) and a second program clock reference (PCR). Although the above has been described with reference to first demultiplexing circuitry and second demultiplexing circuitry, it is to be appreciated that any number of demultiplexors may be used.

The multi-media device also includes buffer circuitry and indexing circuitry. The first video PES and second video PES may be stored in the buffer circuitry as received. The indexing circuitry is configured to locate a presentation time stamp (PTS) in the first video PES, and store in the buffer circuitry a value and location of that PTS in the first video PES. The indexing circuitry is also configured to locate a start of each group of pictures (GOP) in the first video PES to be stored in the buffer circuitry, and store in the buffer circuitry locations of the starts of the GOPs in the first video PES.

The indexing circuitry is further configured to locate a presentation time stamp (PTS) in the second video PES and store in the buffer circuitry a value and location of that PTS in the second PES. The indexing circuitry is also configured to locate a start of each group of pictures (GOP) in the second video PES to be stored in the buffer circuitry, and store in the buffer circuitry locations of the starts of the GOPs in the second video PES.

Buffer control circuitry is configured to empty the buffer circuitry of the oldest GOP in the first video PES if the current PCR at the first demultiplexor is greater than the PTS of the second oldest GOP in the first video PES and empty the buffer circuitry of the oldest GOP in the second video PES if the current PCR at the second demultiplexor is greater than the PTS of the second oldest GOP in the second video PES. Playback circuitry is configured to perform a selective switching between playback of the first channel stream and the second channel stream.

The first channel stream may also have embedded therein a first audio packetized elementary stream (PES), and the second channel stream may likewise also have embedded therein a second audio packetized elementary stream (PES). The first demultiplexing circuitry may be further configured to demultiplex from the first channel stream a first audio packetized elementary stream (PES), and the second demultiplexing circuitry may be further configured to demultiplex from the second channel stream a second audio packetized elementary stream (PES). The buffer control circuitry may be further configured to discard each PES packet of the first audio PES that has a PTS that is less than the PTS of the oldest GOP stored in the first buffer, and to discard each PES packet of the second audio PES that has a PTS that is less than the PTS of the oldest GOP stored in the second buffer.

Playback of the first channel stream by the playback circuitry may include synchronized playback of the first video PES and the first audio PES. Playback of the second channel stream by the playback circuitry may include synchronized playback of the second video PES and the second audio PES.

The first video PES as embedded in the first channel stream may be at a first resolution, and the first video PES received from the first demultiplexing circuitry may be at a second resolution. The second video PES as embedded in the second channel stream may be at the first resolution, and the second video PES received from the second demultiplexing circuitry may be at the second resolution. In an embodiment, the first and second resolution may be the same resolution.

DETAILED DESCRIPTION

In the following detailed description and the attached drawings, specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

Figure 1:
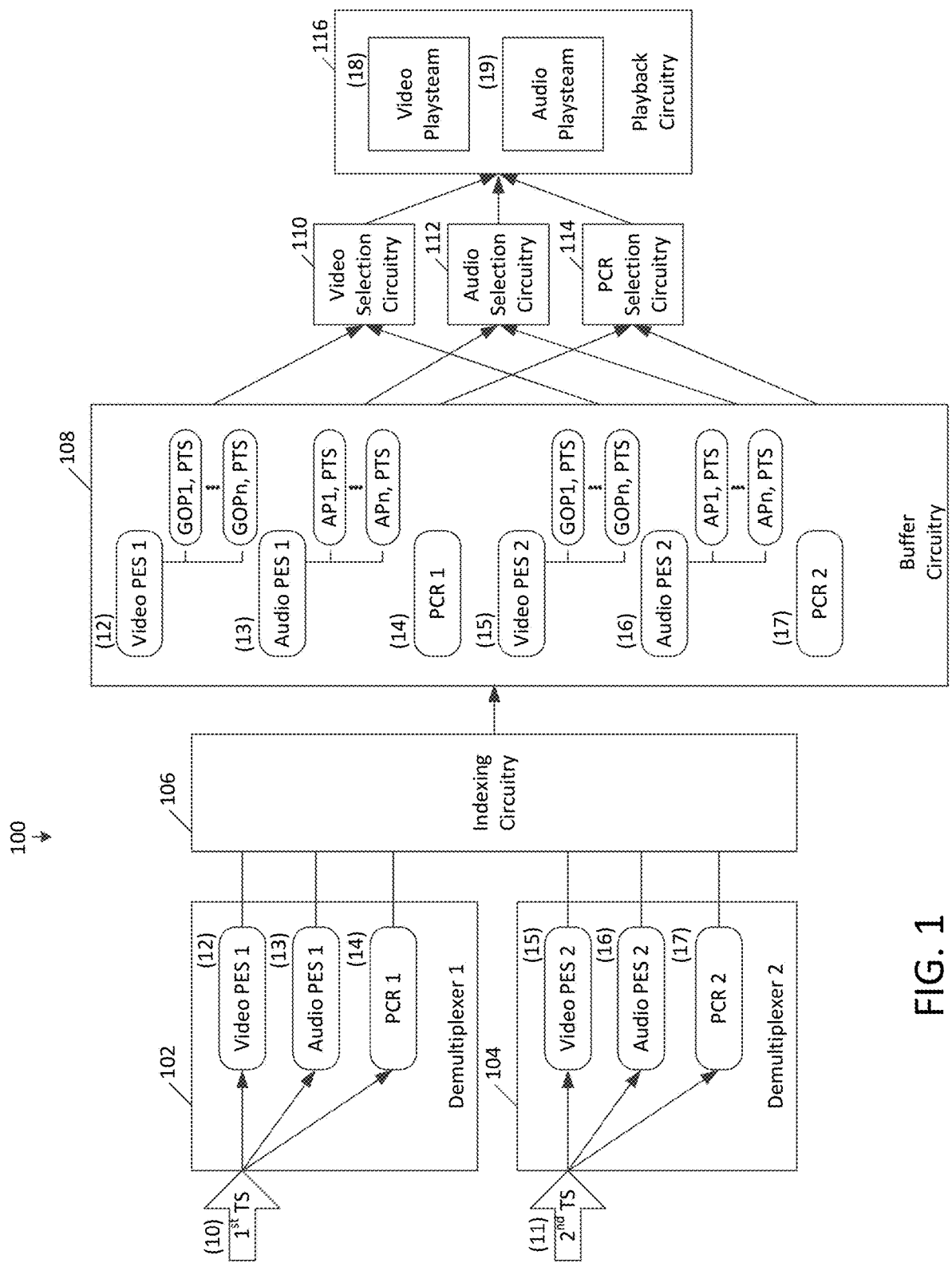
FIG. 1 is a diagrammatical block diagram of a multi-media device in accordance with this disclosure.

With initial reference to FIG. 1, a multi-media device 100 for receipt and playback of digital cable, satellite, or interne television programming is now described. Although the following will be described with reference to Motion Picture Experts Group (MPEG) video playback, it should be understood that these principles can be applied to other video formats.

The multi-media device 100 receives multiple transport streams TS, although for simplicity of description, two transport streams 10 and 11 are shown. The first transport stream 10 is demultiplexed by demultiplexer 102 into its constituent components, namely a first video packetized elementary stream (PES) 12, a first audio PES 13, and a first program clock reference (PCR) 14, which are stored in the buffer circuitry 108. Similarly, the second transport stream 11 is demultiplexed by demultiplexer 104 into its constituent components, namely a second video PES 15, a second audio PES 16, and a second PCR 17, which are stored in the buffer circuitry 108. Those of skill in the art will recognize that the buffer circuitry 108 may include one or more suitable buffers of any type.

As the demultiplexing is performed by the demultiplexers 102 and 104, indexing circuitry 106 indexes the first video PES 12, first audio PES 13, first PCR 14, second video PES 15, second audio PES 16, and second PCR 17 for entry into buffer circuitry 108. As can be seen in the diagrammatical view of the contents of the buffer circuitry 108, the first video PES 12 includes groups of pictures GOP1 . . . GOPn, with each group of pictures having its own presentation time stamp (PTS) associated therewith. Similarly, the first audio PES 13 includes audio packets AP1 . . . APn, with at least some of the audio packets having their own PTS associated therewith. A first PCR 14 is associated with the first video PES 12 and first audio PES 13.

The second video PES 15 includes groups of pictures GOP1 . . . GOPn, with each group of pictures having its own PTS associated therewith. The second audio PES 16 includes audio packets AP1 . . . APn, with each audio packet having its own PTS associated therewith. A second PCR 17 is associated with the video PES 15 and audio PES 16.

It should be understood that the buffered data remains compressed, and is not uncompressed prior to storage in the buffer 108. An advantage of this is that it supports reduction of memory requirements. It should also be understood that since this technique involves indexing and does not uncompress the received data, the received data remains secure. In fact, since the indexing circuitry 106 is upstream of the playback circuitry 116 that decodes the received data, the storage of the indexed data is in its original compressed format.

If the current first PCR for the first video PES 12 is greater than (e.g., is a later time stamp) the PTS for the second oldest GOP stored in the buffer 108, then the oldest GOP stored in the buffer is discarded. In addition, all audio packets having a PTS less than (e.g., having an early time stamp) the oldest GOP PTS are discarded. This way, stale groups of pictures and their associated audio packets are discarded, ensuring that when a channel change is requested, the latest groups of pictures and their associated audio packets are immediately ready for decoding and manifestation.

Video selection circuitry 110 selects which of the first or second video PESs 12 and 15 is to be passed to the playback circuitry 116. Audio selection circuitry 112 selects which of the first or second audio PESs 13 and 16 is to be passed to the playback circuitry 116, and PCR selection circuitry 114 selects which of the first or second PCRs 14 or 17 is to be passed to the playback circuitry 116 as the video playstream 18 and its accompany audio playstream 19 for playback.

It should be appreciated that this described updating of the buffer 108 and discarding of the stale groups of pictures and their associated audio packets is performed continuously. In addition, it should be appreciated that the GOPs are stored in the buffer 108 at the same full resolution in which they are received by multiplexers 102 and 104.

Figure 2:
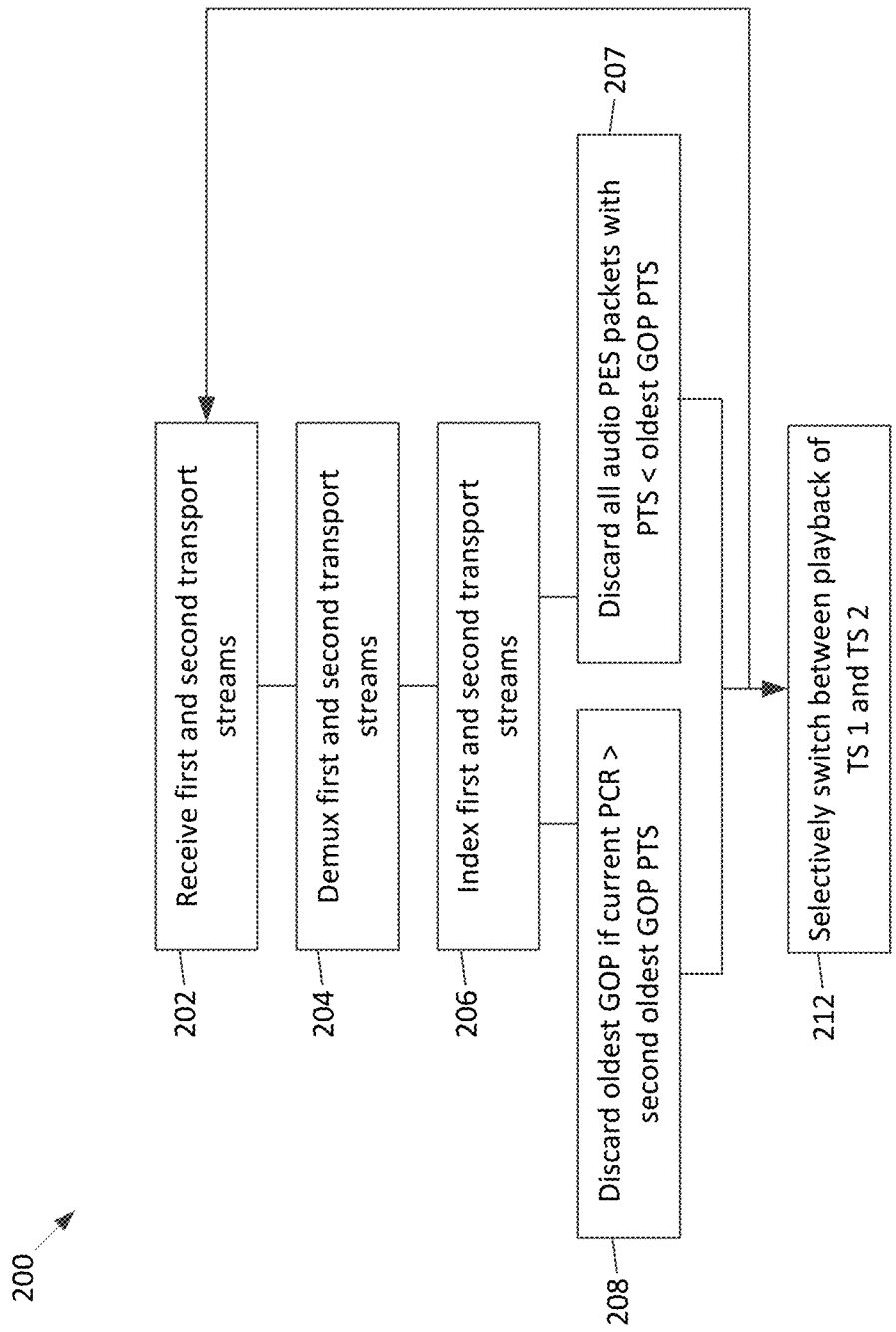
FIG. 2 is a flowchart showing a technique for operating the multi-media device of FIG. 1 so as to reduce latency during channel change.

In general, the technique for operation of the multi-media device 100 is now described with reference to flowchart 200 of FIG. 2. Here, first and second transport streams are received (Block 202), and then demultiplexed (Block 204). The first and second transport streams are then indexed (Block 206). The oldest GOP is discarded if the current PCR is greater than the PTS of the second oldest GOP (Block 208), and all audio PES packets having a PTS earlier in time than the PTS of the oldest GOP are discarded (Block 207). By utilizing this caching of new data and discarding of stale data, selectively switching between playback of the first and second transport streams is enabled (Block 212) with a low latency.

Figure 3:
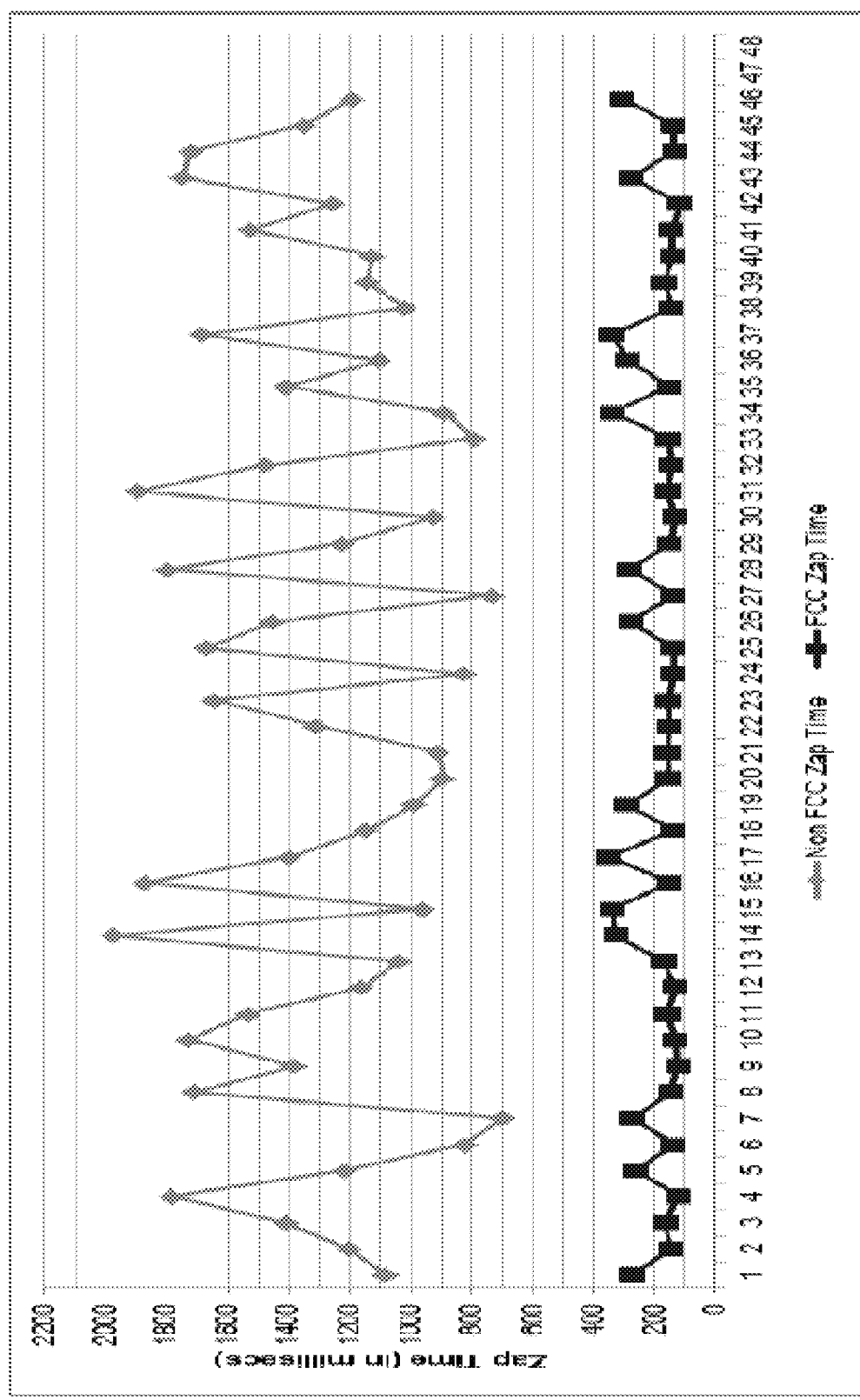
FIG. 3 is a graph showing channel latency during channel change using the technique of FIG. 2 versus channel latency during channel change using prior art techniques.

This low latency can be seen in FIG. 3, where the time to perform a channel change is referred to as "zap time". The traces on the top of FIG. 3 show an average zap time of around 1200 ms zap time over a plurality of channel changes, and represent operation where traditional channel change techniques are used. The traces on the bottom of FIG. 4 show an average zap time of around 200 ms over a plurality of channel changes, and represent operation using the channel change technique described herein. This represents an average improvement of 600%, greatly decreasing the zap time, and providing for a large commercial advantage over prior art channel change techniques.

Another advantage of this technique is that each transport stream is demultiplexed but once, and the video PESs 12 and 15 are decoded for playback but once, reducing the processing power used by the playback circuitry 116.

Although the preceding description has been described herein with reference to particular circuits and embodiments, it is not intended to be limited to the particulars disclosed herein; rather, it extends to all functionally equivalent structures, methods, and uses, such as are within the scope of the appended claims.

The invention claimed is:

1. A multi-media device, comprising:
   demultiplexing circuitry configured to receive a channel stream and to demultiplex the channel stream into a video packetized elementary stream (PES), an audio packetized elementary stream (PES), and a program clock reference (PCR);
   buffer circuitry storing the video PES and the audio PES as received;
   indexing circuitry configured to:
      locate a presentation time stamp (PTS) in the video PES, and store a value and location of that PTS in the video PES, in the buffer circuitry;
      locate a start of each group of pictures (GOP) in the video PES as stored in the buffer circuitry, and store locations of the start of each GOP in the video PES, in the buffer circuitry; and
      locate a presentation time stamp (PTS) in the audio PES, and store a value and location of that PTS in the audio PES, in the buffer circuitry; and
   buffer control circuitry configured to:
      empty the buffer circuitry of an oldest GOP in the video PES where the PCR is greater than the PTS of a second oldest GOP stored in the buffer circuitry; and
      empty the buffer circuitry of each PES packet of the audio PES that has a PTS that is less than the PTS of the oldest GOP stored in the buffer circuitry.

2. The multi-media device of claim 1, wherein the video PES as embedded in the channel stream and the video PES received from the demultiplexing circuitry are at the same resolution.

3. The multi-media device of claim 1, further comprising playback circuitry configured to play the channel stream by synchronizing the video PES and the audio PES.

4. The multi-media device of claim 1, wherein the buffer control circuitry is configured to empty the buffer circuitry of the oldest GOP in the video PES only if the PCR is greater than the PTS of the second oldest GOP stored in the buffer circuitry.

5. A method, comprising:
   receiving first and second digital video streams;
   storing the first and second digital video streams in buffer circuitry;
   processing the first digital video stream as received to:
      locate a presentation time stamp in the first digital video stream and store in the buffer circuitry a value and location of the presentation time stamp in the first digital video stream;
      locate a start of each group of pictures in the first digital video stream as stored in the buffer circuitry and store in the buffer circuitry locations of the start of each group of pictures of the first digital video stream stored in the buffer circuitry; and
      monitor a program clock reference for the first digital video stream and empty the buffer circuitry of an oldest group of pictures if the program clock reference of the first digital video stream is greater than the presentation time stamp of a second oldest group of pictures of the first digital video stream; and
   processing the second digital video stream as received to:
      locate a start of each group of pictures in the second digital video stream as stored in the buffer circuitry and store in the buffer circuitry locations of the start of each group of pictures of the second digital video stream stored in the buffer circuitry; and
      monitor a program clock reference for the second digital video stream and empty the buffer circuitry of the oldest group of pictures of the second digital video stream if the program clock reference of the second digital video stream is greater than the presentation time stamp of the second oldest group of pictures of the second digital video stream;
   displaying the first digital video stream; and
   switching from displaying the first digital video stream to displaying the second digital video stream in response to user input.

6. The method of claim 5, wherein the first digital video stream is displayed at a first resolution; and wherein the second digital video stream is displayed at a second resolution.

7. The method of claim 6, wherein the first and second resolutions are the same.

8. The method of claim 5, wherein the first digital video stream comprises a first video packetized elementary stream (PES); wherein the second digital video stream comprises a second video packetized elementary stream (PES); and further comprising receiving first and second audio packetized elementary streams (PES);
   storing the first audio PES and the second audio PES in the buffer circuitry;
   processing the first audio PES as received to:
      locate a presentation time stamp and store in the buffer circuitry a value and location of that presentation time stamp in the first audio PES;
      discard each PES packet of the first audio PES that has a presentation time stamp that is less than the presentation time stamp of the oldest group of pictures that is stored in the buffer circuitry;
   processing the second audio PES as received to:
      locate a presentation time stamp and store in the buffer circuitry a value and location of that presentation time stamp in the second audio PES;
      discard each PES packet of the second audio PES that has a presentation time stamp that is less than the presentation time stamp of the oldest group of pictures stored in the buffer circuitry.

9. The method of claim 8, further comprising playing the first audio PES concurrently with displaying the first digital video stream, and switching from playing the first audio PES to playing the second audio PES concurrently with the switching from displaying the first digital video stream to displaying the second digital video stream.

10. The method of claim 8, wherein the first video PES, first audio PES, and program clock reference for the first video PES are received from a first demultiplexer; and further comprising receiving a first channel stream at the first demultiplexer, the first channel stream including embedded therein the first video PES, first audio PES, and program clock reference for the first video PES.

11. The method of claim 10, wherein the first channel stream is compressed.

12. The method of claim 10, wherein the first video PES embedded in the first channel stream is at a first resolution; and wherein the first video PES received from the first demultiplexer is at a second resolution the same as the first resolution.

13. The method of claim 8, wherein the second video PES, second audio PES, and program clock reference for the second video PES are received from a second demultiplexer; and further comprising receiving a second channel stream at the second demultiplexer, the second channel stream including embedded therein the second video PES, second audio PES, and program clock reference for the second video PES.

14. The method of claim 5, wherein the second digital video stream as received is processed to monitor the program clock reference for the second digital video stream and empty the buffer circuitry of the oldest group of pictures of the second digital video stream only if the program clock reference of the second digital video stream is greater than the presentation time stamp of the second oldest group of pictures of the second digital video stream.

15. A multi-media device, comprising:
  first demultiplexing circuitry configured to receive a first channel stream and to demultiplex the first channel stream into a first video packetized elementary stream (PES) and a first program clock reference (PCR);
  second demultiplexing circuitry configured to receive a second channel stream and to demultiplex the second channel stream into a second video packetized elementary stream (PES) and a second program clock reference (PCR);
  buffer circuitry storing the first and second channel streams as received;
  indexing circuitry configured to:
    locate a presentation time stamp (PTS) in the first video PES and store in the buffer circuitry a value and location of that PTS in the first video PES;
    locate a start of each group of pictures (GOP) in the first video PES as stored in the buffer circuitry and store in the buffer circuitry locations of the start of each GOP of the first video PES stored in the buffer circuitry;
    locate a presentation time stamp (PTS) in the second video PES and store in the buffer circuitry a value and location of that PTS in the second video PES;
    locate a start of each group of pictures (GOP) in the second video PES as stored in the buffer circuitry and store in the buffer circuitry locations of the start of each GOP of the second video PES stored in the buffer circuitry;
  buffer control circuitry configured to:
    empty the buffer circuitry of an oldest GOP in the first video PES if the first PCR is greater than the PTS of a second oldest GOP in the first video PES;
    empty the buffer circuitry of an oldest GOP in the second video PES if the second PCR is greater than the PTS of a second oldest GOP in the second video PES;
  playback circuitry configured to selectively switch between playback of the first channel stream and playback of the second channel stream.

16. The multi-media device of claim 15, wherein the first channel stream also has embedded therein a first audio packetized elementary stream (PES); wherein the second channel stream also has embedded therein a second audio packetized elementary stream (PES); wherein the first demultiplexing circuitry is further configured to demultiplex the first channel stream into a first audio packetized elementary stream (PES); wherein the second demultiplexing circuitry is further configured to demultiplex the second channel stream into a second audio packetized elementary stream (PES); wherein the buffer control circuitry is further configured to discard each PES packet of the first audio PES that has a PTS that is less than the PTS of the oldest GOP stored in the buffer circuitry; and wherein the buffer control circuitry is further configured to discard each PES packet of the second audio PES that has a PTS that is less than the PTS of the oldest GOP stored in the buffer circuitry.

17. The multi-media device of claim 16, wherein playback of the first channel stream by the playback circuitry includes synchronized playback of the first video PES and the first audio PES; and wherein playback of the second channel stream by the playback circuitry includes synchronized playback of the second video PES and the second audio PES.

18. The multi-media device of claim 15, wherein the first video PES as embedded in the first channel stream is at a first resolution; wherein the first video PES received from the first demultiplexing circuitry is at a second resolution the same as the first resolution; wherein the second video PES as embedded in the second channel stream is at the first resolution; and wherein the second video PES received from the second demultiplexing circuitry is at the second resolution.

19. The multi-media device of claim 15, wherein the buffer control circuitry is configured to empty the buffer circuitry of the oldest GOP in the first video PES only if the first PCR is greater than the PTS of the second oldest GOP in the first video PES, and to empty the buffer circuitry of the oldest GOP in the second video PES only if the second PCR is greater than the PTS of the second oldest GOP in the second video PES.

* * * * *